May 1, 1956 W. T. ROSSELL 2,743,919
FRICTION DAMPING DEVICE
Filed Dec. 17, 1951 2 Sheets-Sheet 1

INVENTOR
William T. Rossell

BY
ATTORNEY

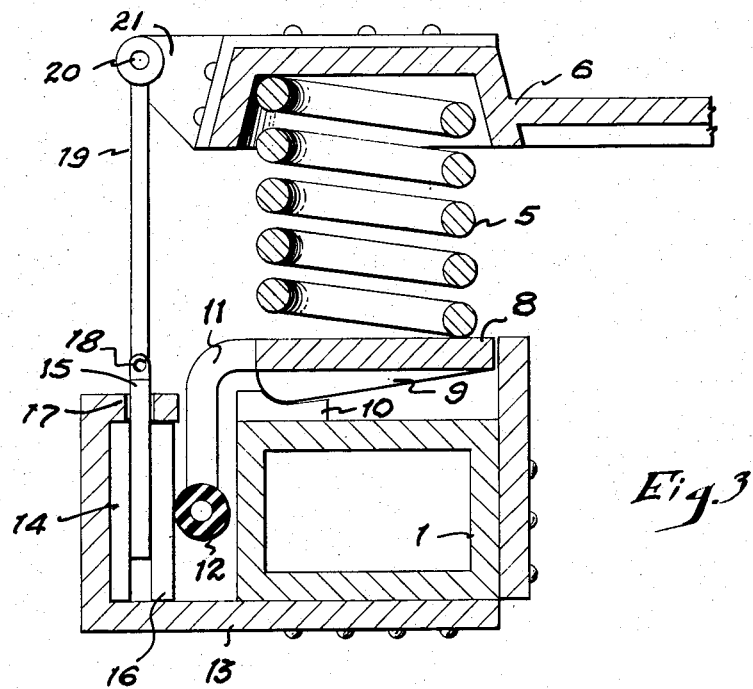
Fig. 3
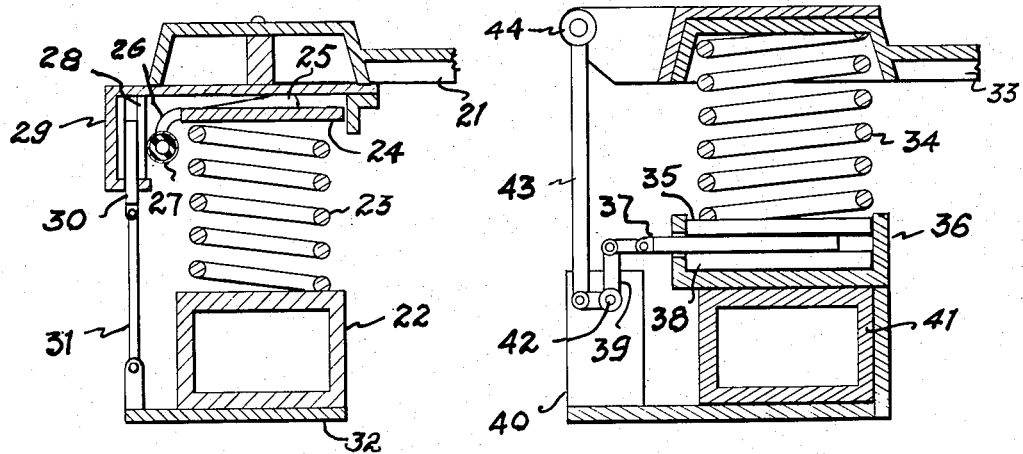
Fig. 4
Fig. 5
INVENTOR
WILLIAM T. ROSSELL

United States Patent Office 2,743,919
Patented May 1, 1956

2,743,919

FRICTION DAMPING DEVICE

William T. Rossell, New York, N. Y., assignor to Transit Research Corporation, New York, N. Y., a corporation of New York Application December 17, 1951, Serial No. 262,012

3 Claims. (Cl. 267—9)

This invention relates to motion damping means, commonly known as snubbers, and has for its object to provide a friction device for use between two relatively movable parts which will impart a snubbing effect in accord with the relative position of the parts.

More particularly, it is the principal object of the invention to provide frictional snubbing means between load imposing and load receiving parts of a vehicle which will afford resistance to relative movement of the parts as directed by any relative momentary position between the parts. Thus, if the static load is increased the friction will be increased and if the parts approach each other closer because of road shocks or for other dynamic reasons the frictional resistance of the snubbing means will increase as though the static load were momentarily increased to the degree or extent resulting in the new position of the parts.

Another object is to provide friction snubbing devices for use between a frame or chassis and a body supported by springs from the chassis, at least one member of the snubbing devices accepting the entire body loading while another relatively movable member of the device moves in proportion to the relative movement between the body and the frame or chassis. In this way, the frictional resistance of the device increases more or less proportionately with increasing body loading.

Another object of the invention is to provide spring caps for main vehicle springs which constitute a part of friction snubbing means, the spring caps acting as means for setting up friction in accordance with the loading thereon.

Figure 1:
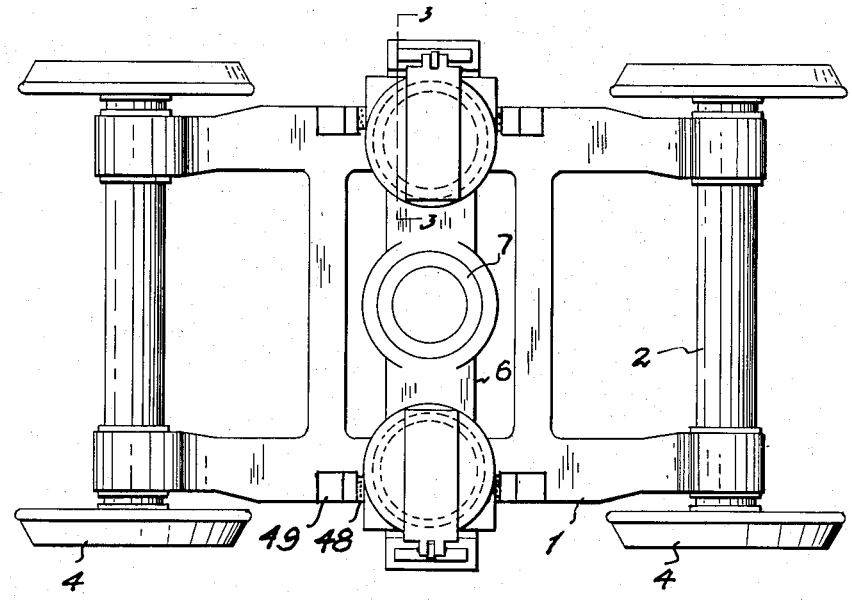
Figure 2:
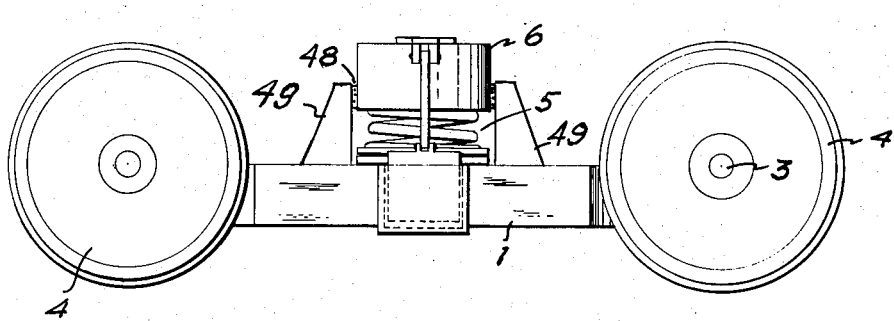

The invention is applicable to automotive type vehicles and also to rail vehicles and is susceptible of many variations of design to accommodate itself to a wide variety of applications as will become more apparent with reference to the accompanying drawings in which Figure 1 represents a top plan view of a rail truck equipped with my improved snubbing means, Figure 2 is a side elevation of the truck shown in Figure 1, Figure 3 is a vertical section taken along the line 3—3 of Figure 1 showing my invention applied to one end of the truck bolster, Figure 4 is a view similar to Figure 1 showing a modified form of my invention, and Figure 5 is a view similar to Figures 3 and 4 showing a further modified form of my invention applied thereto.

More particularly, the numeral 1 indicates the main frame of a rail truck having axle housings 2 secured in the ends of the side rails thereof, the axle housings enclosing axles 3 secured in the hubs of the wheels 4. Intermediate the ends of the side rails of the frame 1 main springs 5 support the ends of a bolster 6 which has a center bearing 7 to receive the king pin of a body (not shown). The springs 5 support the bolster 6 for relative vertical and lateral movements with respect to the frame 1, the bolster being guided in its movements by the friction elements 48 held in supporting brackets 49.

It is contemplated that the control device now to be described will be applied to each end of the bolster but it may be applied to one end only, if desired, and will be described with respect to one end only since the construction will be the same at each end. Also, the control device is illustrated as being applied to the main bolster springs but may be applied to another spring which is subject to some proportion of the weight of the car body supported by the bolster.

The spring 5 rests on a lower spring cap 8, as viewed in Figure 3. The cap 8 has a rocker 9 exteriorly thereof which is received in a trough support 10 fixedly secured to the side frame 1, and an extension arm 11 which depends substantially therebelow. A roller 12 is secured to the lower end of this arm 11.

A bracket 13 forms a supporting enclosure for three friction elements 14, 15 and 16. The element 14 is stationary in the bracket 13 and the element 16 is also stationary with respect to bracket 13 except that it may move toward the element 14 as wear occurs between the elements. It is in direct contact with the roller 12. The element 15 is capable of sliding movement with respect to the elements 14 and 16 and hence extends outwardly through an opening 17 in the bracket 13. At the upper end 18 thereof a link 19 is pivotally secured thereto, this link being pivotally mounted on a pin 20 carried by an extension member 21 fixed to the top of the bolster 6.

The operation will now be described. Assume that the bolster 6 is carrying the weight of an empty body. It will then cause the spring 5 to deflect according to the weight supported and the entire weight will be transmitted to the cap 8. The rocker 9 and its supporting trough 10 are off-set from the center of the spring cap with the result that the cap tends to rotate clockwise thus pressing the roller 12 against the element 16 with a force proportionate to the weight imposed on the cap. The force may be adjusted as desired by varying the amount of offset of the rocker from the center of the cap. Now, if the truck runs over the rails and encounters track irregularities the bolster will have vertical springing movements with respect to the frame. All such movements will be opposed by the friction elements 14, 15 and 16 since the roller 12 always exerts pressure urging the elements together. Increasing deflection of the spring 5 under dynamic loading causes increased pressure on the spring cap 8 and hence increased pressure between the friction plates. The same result occurs with increased body loading and it is therefore evident that the friction between the elements is proportionate to the weight imposed on the spring cap 8 no matter whether that weight is actual body loading or momentary dynamic loading. Another way to view the control is that it is responsive to relative vertical position of the bolster 6 and the side frame 1.

The bolster 6 is also adapted for lateral swinging movements which, in practice, usually amount to about one and one-half inches either way from a central position. The link 19 should be as long as possible so that this motion would not cause undue angularity of the link 19. The device would respond somewhat to the swinging movements if they were sufficient to cause movement of the element 15, the effect being to damp the swinging movements more or less in proportion to their amplitude.

Figure 4 shows a modification in which a bolster 21 is supported from a truck side rail 22 by a spring 23. The spring 23 has an upper spring cap 24 having a rocker 25 exteriorly thereof in contact with the bolster 21, and an arm 26 extending downwardly from the edge thereof. The arm 26 terminates in a roller 27 which contacts a friction plate 28 retained in an enclosing bracket 29 secured to the bolster.

The plate 28 is held only against relative vertical movements with respect to the bracket 29 since it is pressed by the roller 27 against a movable element 30, which, in turn, presses against a third friction element held stationary in the bracket 29.

In operation it will be noted that the fulcrum of the rocker 25 is on the opposite side of the center of the spring cap 24 from the arm 26. Very great leverage may thus be obtained by the tendency of the spring cap to rotate in clockwise direction and hence very large pressures may be built up between the roller 27 and the element 28. By selecting the amount of offset of the fulcrum of the rocker 25 from the center of the cap the proportion of the weight transmitted by the bolster onto the arm 26 may be predetermined. Aside from these matters it is clear that the entire control device in Figure 4 is carried by the bolster and hence is sprung weight. The actuation of the movable element 30 by a link 31 is, thus, reverse to that of the element 15 by the link 19 since the link 31 is pivotally attached at its upper end to the element 30 and pivotally attached at its lower end to a bracket 32 extending outwardly from the bottom of the side rail 1.

Figure 5 illustrates a second modification in which one end of a bolster 33 is supported by a spring 34 resting on a spring cap 35. This cap is, in fact, a friction element retained against lateral movements by an element box 36 and resting upon a second friction element 37 which, in turn, rests upon a third friction element 38, held stationary by the box 36. The element 37 projects through an opening in the box 36 for pivotal attachment to one end of a bell crank 39. A bracket 40 is secured to the frame side rail 41 and carries a pin 42 upon which the bellcrank 39 is pivotally mounted. The other end of the bellcrank is pivotally conected to a link 43 which is connected at its upper end 44 to the bolster 33.

The operation of this form is essentially the same as that of the constructions shown in Figures 3 and 4 except that the weight of the bolster and of the spring 33 is imposed directly upon one of the friction elements 35. Friction between the elements increases with increasing depression of the bolster 33 with respect to the side frame 41, whether caused by dynamic motions or actual increase in body loading on the bolster. Again, the link 43 should be as long as possible to lessen the effect of the lateral swinging movements on the control of the vertical movements since it is best to control the lateral movements by a different device.

Various modifications may be made without departing from the spirit of my invention and I desire to be extended protection as defined by the appended claims.

What I claim is:

1. A spring and snubbing assembly comprising a load imposing and a load receiving member adapted to move vertically with respect to each other, a spring separating said members, a spring cap between said spring and said load imposing member, said spring cap having a rocker outwardly of said spring and substantially offset from the axis of said spring whereby it tends to tilt in response to the weight of said load imposing member on said spring, side by side friction elements carried by said load imposing member, an extension on said spring cap acting as a lever transmitting the force of the tilting tendency of said spring cap against one of said friction elements thereby pressing it against the other element in proportion to the loading of said load imposing member on said spring, and a link connecting another of said friction elements with said load receiving member for sliding said second element on said first element as said members move with respect to each other.

2. In combination, two main members, a spring vertically separating said members, a spring cap for one end of said spring separating it from one of said members, said cap having a rocker outwardly of said spring offset with respect to its center whereby said spring cap tends to rock with respect to said spring and said one member, a friction pack adjacent said cap opposing actual rocking movement of said spring cap, said friction pack being composed of at least two relatively movable friction elements, said spring cap imposing a pressure between said friction elements according to its tendency to rock, and a link substantially parallel to the axis of said spring connecting one of said friction elements to the other of said main members for movement of said one friction element in response to relative movements of said main members in a direction causing vertical deflection of said spring.

3. In combination, two main members, a spring vertically separating said members, a spring cap for one end of said spring separating it from one of said members, said cap having a rocker outwardly of said spring offset with respect to its center whereby said spring cap tends to rock with respect to said one member, a friction pack comprising at least two friction elements one of which is stationary and the other movable with respect thereto, said friction pack being vertically disposed, said spring cap having an arm which extends laterally and vertically with respect thereto for altering the direction of the forces tending to rock said cap, the outer end of said arm contacting said stationary friction element and imposing pressure between said elements proportionate to the force tending to rotate said spring cap, and a linkage substantially parallel with the axis of said spring connecting said movable element with the other of said main members whereby said movable element is moved according to the relative movements of said main members in a direction causing vertical deflection of said spring.

References Cited in the file of this patent

UNITED STATES PATENTS

| 1,307,311 | O'Connor | June 17, 1919 |
| 1,707,765 | O'Connor | Apr. 2, 1929 |
| 2,237,382 | Woodling | Apr. 8, 1941 |
| 2,396,796 | Lounsbury | Mar. 19, 1946 |
| 2,483,185 | Crabtree | Sept. 27, 1949 |
| 2,558,381 | Pointer | June 26, 1951 |